(12) United States Patent
Jain

(10) Patent No.: US 12,003,488 B2
(45) Date of Patent: Jun. 4, 2024

(54) PROTECTING CLOUD APPLICATION SECRET KEY WITH MULTI-PARTY COMPUTATION ALGORITHM

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 16/950,314

(22) Filed: Nov. 17, 2020

(65) Prior Publication Data

US 2022/0158980 A1    May 19, 2022

(51) Int. Cl.
*H04L 9/40*    (2022.01)
*G06F 9/455*    (2018.01)
*H04L 101/663*    (2022.01)

(52) U.S. Cl.
CPC ...... *H04L 63/0281* (2013.01); *G06F 9/45558* (2013.01); *H04L 63/062* (2013.01); *H04L 63/083* (2013.01); *G06F 2009/45587* (2013.01); *G06F 2009/45595* (2013.01); *H04L 2101/663* (2022.05)

(58) Field of Classification Search
None
See application file for complete search history.

(56) References Cited

U.S. PATENT DOCUMENTS

| | | | |
|---|---|---|---|
| 9,954,680 B1 * | 4/2018 | Machani | H04L 9/0825 |
| 10,298,577 B1 * | 5/2019 | Aithal | G06F 9/45558 |
| 11,423,504 B2 * | 8/2022 | Spies | G06Q 99/00 |
| 2007/0140479 A1 * | 6/2007 | Wang | H04L 9/30 380/30 |
| 2014/0317686 A1 * | 10/2014 | Vetillard | G06F 21/74 726/2 |
| 2016/0142204 A1 * | 5/2016 | Coleridge | H04L 9/0894 380/44 |
| 2017/0155634 A1 * | 6/2017 | Camenisch | H04L 9/085 |
| 2018/0137299 A1 | 5/2018 | Porter et al. | |
| 2018/0270065 A1 * | 9/2018 | Brown | H04L 9/0861 |
| 2019/0268149 A1 * | 8/2019 | Kariv | H04L 9/0897 |
| 2019/0268308 A1 * | 8/2019 | Sinha | H04L 9/3239 |
| 2019/0327088 A1 * | 10/2019 | Camenisch | H04L 9/14 |

(Continued)

OTHER PUBLICATIONS

"Communication: The Extended European Search Report", European Patent Office, dated Feb. 17, 2022 (Feb. 17, 2022) for European Application No. 21199708.5-1218, 10pgs.

(Continued)

*Primary Examiner* — Trang T Doan
(74) *Attorney, Agent, or Firm* — Buckley, Maschoff & Talwalkar LLC

(57) ABSTRACT

Methods and systems may be associated with a cloud computing environment. A proxy platform data store may contain node data associated with nodes of the cloud computing environment. Each node might, for example, store multi-party computation information. A proxy platform, able to access the proxy platform data store, may detect that a first node needs to access a cloud application secret key and determine, based on information in the proxy platform data store, a set of nodes associated with the secret key that the first node needs to access. The proxy platform may then use a multi-party computation algorithm and information received from the set of nodes to generate the secret key.

20 Claims, 11 Drawing Sheets

(56) References Cited

U.S. PATENT DOCUMENTS

2020/0089916 A1* 3/2020 Buendgen ............. H04L 9/0897
2021/0019194 A1* 1/2021 Bahl .................... H04L 67/1031
2021/0374234 A1* 12/2021 Bursell ............... G06F 21/6218
2022/0050906 A1* 2/2022 Mulligan ............ G06F 21/6209
2022/0085979 A1* 3/2022 Sehrawat .............. H04L 9/3093

OTHER PUBLICATIONS

Dingledine, Roger et al., "The Free Haven Project: Distributed Anonymous Storage Service", Electronic Publishing, Artistic Imaging, and Digital Typography, [Lecture Notes in Computer Science, ISSN: 0302-9743], vol. 2009, Dec. 17, 2000, XP-002375816, ISBN: 978-3-540-24128-7, (pp. 1-23, 23 total pages).

Mashima, Daisuke "Safeguarding Health Data with Enhanced Accountability and Patient Awareness", Dec. 1, 2012 (Dec. 1, 2012), XP055445427, retrieved from the Internet: URL:https://smartech.gaech.edu/bitstream/handle/1853/45775/mashima_daisuke_201212_phd.pdf, [retrieved on Jan. 29, 2018], 162pgs.

* cited by examiner

PROTECTING CLOUD APPLICATION SECRET KEY WITH MULTI-PARTY COMPUTATION ALGORITHM

BACKGROUND

An enterprise may utilize a cloud computing environment to let users perform computing tasks. For example, the enterprise might let various users execute an application via a cloud computing environment to process purchase orders, adjust human resources information, generate invoices, etc. To improve security of such application, a node executing in the cloud computing environment may need to access a secret key, such as an encryption password for the application. Storing such a secret key at a node, however, such as in memory or on disk, can pose a risk if the node becomes compromised (e.g., during a cyber-attack). Protecting such a secret key can be a difficult process, and it would therefore be desirable to facilitate protection of a cloud computing environment secret key using a multi-party computation algorithm in a secure, automatic, and efficient manner.

SUMMARY

According to some embodiments, methods and systems may be associated with a cloud computing environment. Methods and systems may be associated with a cloud computing environment. A proxy platform data store may contain node data associated with nodes of the cloud computing environment. Each node might, for example, store multi-party computation information. A proxy platform, able to access the proxy platform data store, may detect that a first node needs to access a cloud application secret key and determine, based on information in the proxy platform data store, a set of nodes associated with the secret key that the first node needs to access. The proxy platform may then use a multi-party computation algorithm and information received from the set of nodes to generate the secret key.

Some embodiments comprise: means for detecting, by a proxy platform, that a first node needs to access a cloud application secret key; means for determining, based on information in a proxy platform data store, a set of nodes associated with the secret key that the first node needs to access, wherein the proxy platform data store contains node data associated with nodes of a cloud computing environment, each node storing multi-party computation information; and means for using a multi-party computation algorithm and information received from the set of nodes to generate the secret key.

Some technical advantages of some embodiments disclosed herein are improved systems and methods to facilitate protection of a cloud computing environment secret key using a multi-party computation algorithm in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
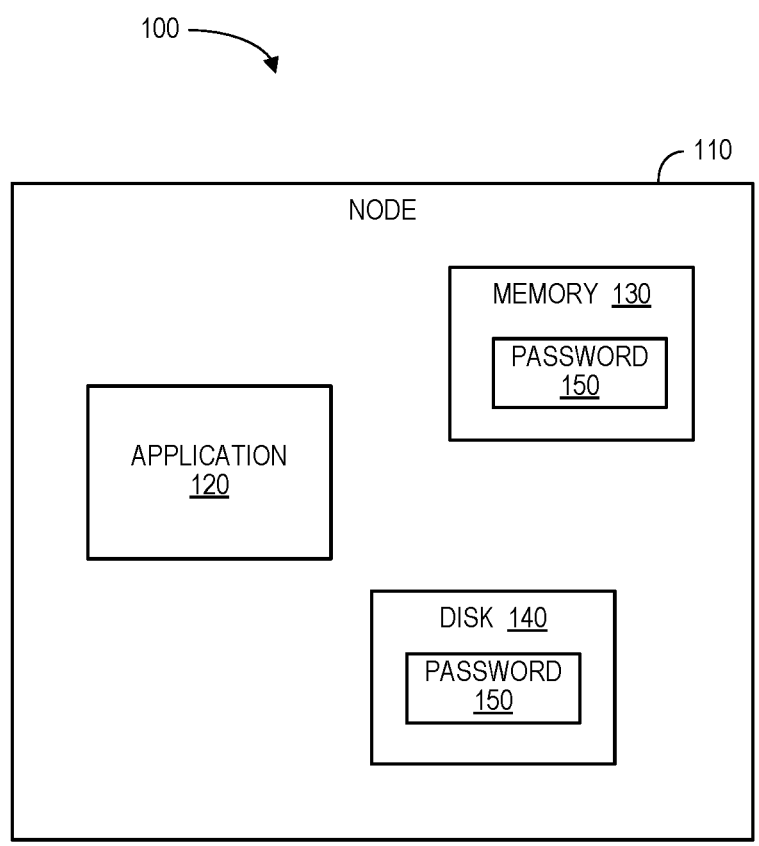
FIG. 1 illustrates an example of a cloud computing node storing a secret key.

Many cloud applications deployed on cloud platforms, such as cloud foundry or Kubernetes, need a way to store credentials for accessing other services (e.g., a database or third-party service such as an object store, etc.). For example, FIG. 1 illustrates an example 100 of a cloud computing node 110 (e.g., a Virtual Machine ("VM") or container) executing an application 120 and having a memory 130 and a disk 140 storing a password 150. The password 150 or similar credentials are often stored in plain text on the disk 140 or in the memory 130 of a process. If encryption is applied to these credentials, the keys may be stored on the disk 140 (so that those can be fetched during runtime to decrypt the credentials). This approach can lead to a security risk because those keys are may be stored, for example, the disk 140 and if storage is compromised the whole system may be compromised. On the other hand, if the node 110 or application 120 is compromised, the memory or by snooping over the network, a key can be deciphered because not all internal communications may be Secure Sockets Layer ("SSL") enabled.

If the key is stored on the disk 140 and brought over the network completely, the system runs the risk of compromise either on storage or attacks such as SSL high jacking even if SSL is enabled. If instead of using credentials, the system uses a secure storage, then in that case the credentials to access the secure storage needs to be provisioned within the application 120. Therefore, the problems remain the same.

Any compromise to the application 120 may render the credentials either of the application 120 or of the secure storage open to an attacker.

Figure 2:
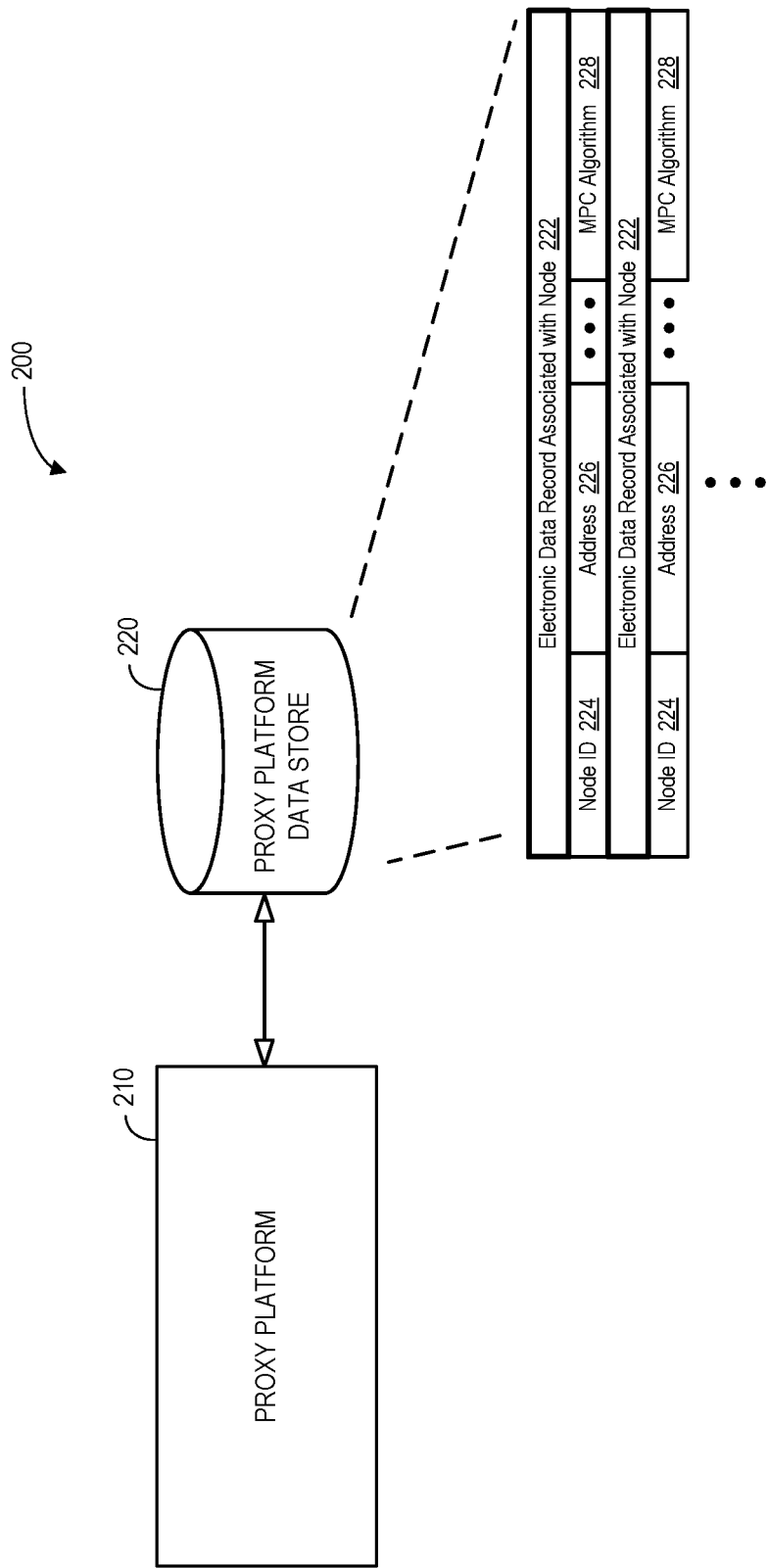
FIG. 2 is a high-level block diagram of a system in accordance with some embodiments.

To address such problems, FIG. 2 is a high-level block diagram of a system 200 in accordance with some embodiments. The system 200 includes a proxy platform 210 that accesses information in a proxy platform data store 220. The proxy platform 210 might use this information, for example, to help determine a secret key for a cloud computing application. The process might be performed automatically or be initiated via a command from a remote operator interface device. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The proxy platform 210 may store information into and/or retrieve information from various data stores (e.g., the proxy platform data store 220), which may be locally stored or reside remote from the proxy platform 210. Although a single proxy platform 210 and proxy platform data store 220 are shown in FIG. 2, any number of such devices may be included. Moreover, various devices described herein might be combined according to embodiments of the present invention. For example, in some embodiments, the proxy platform data store 220 and the proxy platform 210 might comprise a single apparatus. The system 200 functions may be performed by a constellation of networked apparatuses, such as in a distributed processing or cloud-based architecture.

A user or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how systems interact) and/or provide or receive automatically generated recommendations or results from the system 200. The proxy platform data store 220 may contain electronic data records 222 associated with a compute node (e.g., with each record containing a node identifier 224, a node address 226, a Multi-Party Computation ("MPC") algorithm 228, etc.). As used herein, the phrase "multi-party computation) may refer to an area of cryptography having a goal of creating methods for entities to jointly compute a function using inputs while keeping those inputs private.

Figure 3:
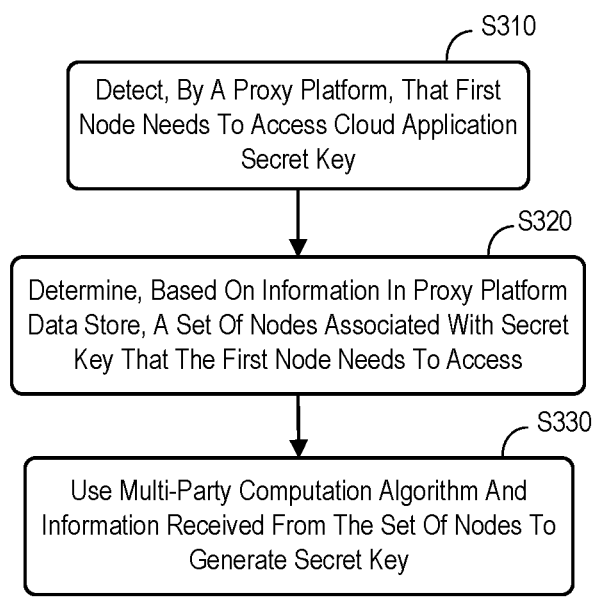
FIG. 3 is a method according to some embodiments.

FIG. 3 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a proxy platform may detect that that a first node (e.g., a VM or container) needs to access a cloud application secret key (e.g., a key associated with a cloud application password). In some embodiments, the proxy platform executes on the first node. Moreover, the detection may be associated with a Transmission Control Protocol ("TCP") proxy server that communicates via localhost. For example, the detection may comprise interception of an encrypted password request.

At S320, the system may determine, based on information in a proxy platform data store, a set of nodes associated with the secret key that the first node needs to access. The proxy platform data store may, for example, contain node data associated with nodes of the cloud computing environment, each node storing multi-party computation information. At S330, the system may use a multi-party computation algorithm and information received from the set of nodes to generate the secret key. According to some embodiments, the multi-party computation information is stored in a secure enclave of each node (e.g., associated with a Trusted Execution Environment ("TEE"), an INTEL® Software Guard Extension ("SGX"), an AMD® Secure Encrypted Virtualization ("SEV") or a similar enclaving technology, etc.).

Figure 4:
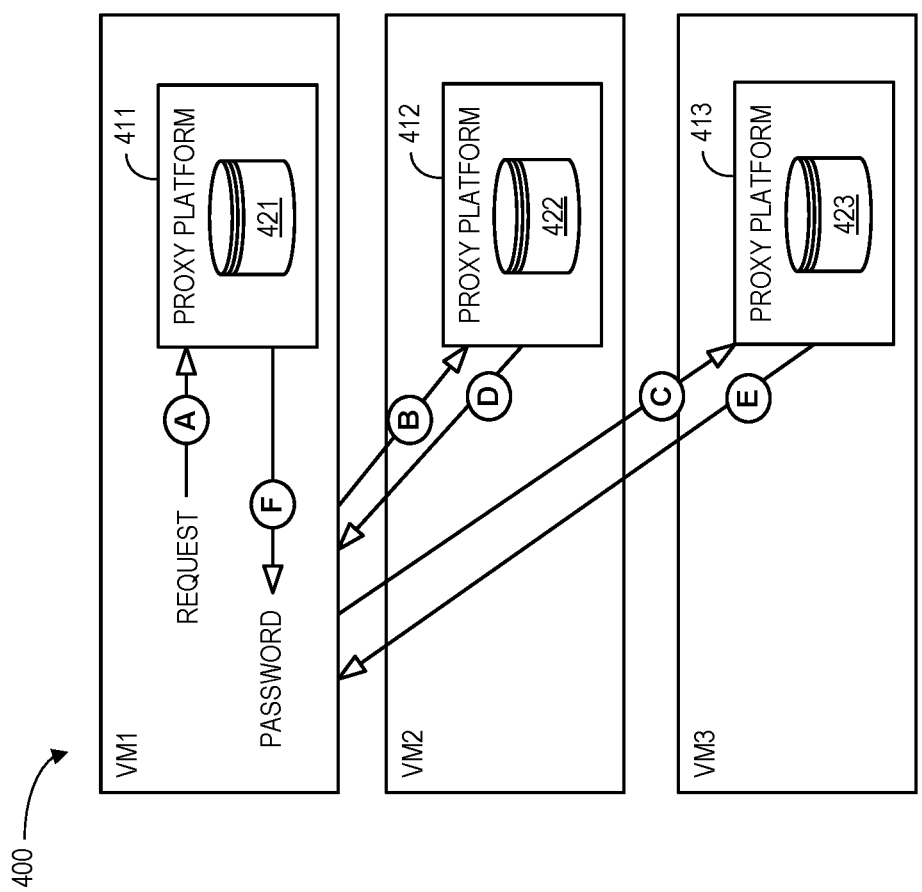
FIG. 4 is a more detailed view of a system architecture in accordance with some embodiments.

Consider, for example, FIG. 4 is a more detailed view of a system 400 architecture in accordance with some embodiments. Note that a proxy platform may exist on all virtual machines and store the part credentials of MPC in the enclave of each individual VM (proxy machine 411 and proxy platform data store 421 on VM1, proxy machine 412 and proxy platform data store 422 on VM2, and proxy machine 413 and proxy platform data store 423 on VM3). At (A), VM1 may send a request for a secret password to proxy platform 411 including a first "portion" of information that can be used to construct the password. The proxy platform 411 stores the first portion and requests additional portions from VM2 and VM3 at (B) and (C) (based on node information stored in proxy platform data store 421). VM2 and VM3 send second and third portions of the secret key back to proxy platform 411 at (D) and (E). The proxy platform 411 uses the three portions of information and a multi-party computation algorithm to create the secret password which is then provided to VM1 at (F).

Thus, embodiments may provide:
- A container hosting an application that never stores any credentials either in memory or on its file system.
- The VM hosting the container application also doesn't store full credentials but instead only a portion or a mathematical factor of the same. According to some embodiments, the factored portion is stored within a secure enclave. The factor portions may be distributed into multiple VMs.

The system may then construct a key by a function running securely by obtaining partial data from multiple VMs. Such a mechanism, known as the multi-party computation, may be applied to protect application secrets for the VM or container running the application. Embodiments may address security problems at two levels:
- Multi-party computation is used to compute the password "on-the-fly" or in substantially real time.
- The password is always computed in a secure enclave. The decryption of the secret also happens within the secure enclave (e.g., outside of the actual application process memory).

Figure 5:
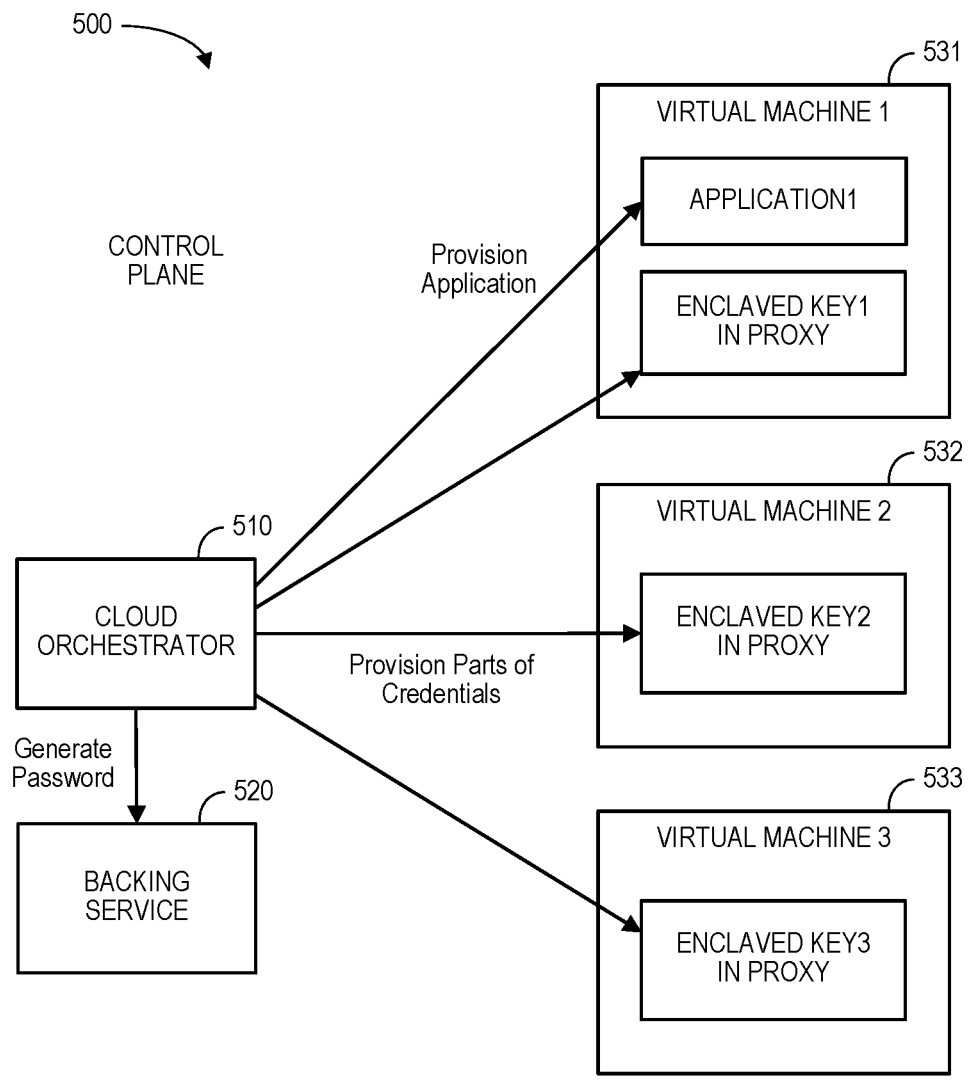
FIG. 5 is a control plane implementation in accordance with some embodiments.

FIG. 5 is a control plane 500 implementation in accordance with some embodiments. Assume there is a cloud application executing on a first VM 531 that needs to access a database server and must use a secret password to access the database. When the application makes a request for getting a password for a service, the provisioner of the application, such as cloud foundry or Kubernetes, generates a partial key (KEY1) for the password and keeps it on the VM 531 on which the application is running.

The VM 531 on which the container is running may execute a TCP proxy server that proxies the call to the services outside on behalf of the container. The container always accesses the TCP proxy server over localhost (meaning that the container always talks via localhost). The partial password may be stored on VM storage and then be brought into an enclave memory of the proxy during startup. Note that in an enclave, such as SGX or a similar enclaving technology, the memory is not even visible to a root user. Instead, it would only be accessible to the Central Processing Unit ("CPU") during computation.

A cloud orchestrator 510 also keeps part of the key on other VMs it is managing (e.g., KEY2 on a second virtual machine 532 and KEY3 on a third virtual machine 533). This means that the password is broken into multiple parts mathematically and is distributed across a set of nodes. Each node runs a similar proxy process which has an enclaving around the partial password that node holds. The proxy running on the VM which runs the application also is injected with the IP of the other proxies that hold the partial password for the application (e.g., via a backing service 520).

Figure 6:
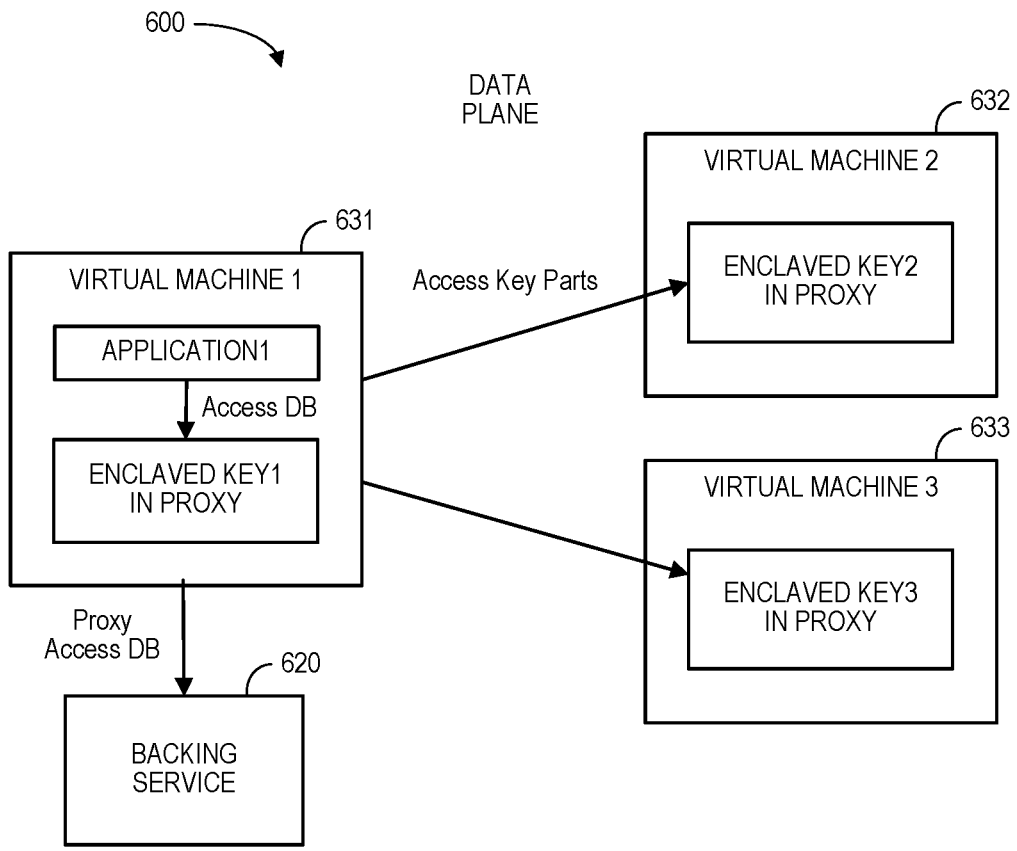
FIG. 6 is a data plane implementation according to some embodiments.

FIG. 6 is a data plane 600 implementation according to some embodiments. When the application running on the first VM 631 tries to access the DB for which it needs the password, it sends out a request to the database with the encrypted password. This request is intercepted by the TCP proxy on the VM 631 and since the proxy has the partial password in its enclave, it reaches out to other proxies (residing on other VMs 632, 633) to get the other partial keys. The system may then load all of these partial keys into the enclave alongside the partial password that it already has. The system can then use these partial keys to compute the final password (which can be used to decrypt information as required).

Note that the application generating the request may send a partial key to the proxy server. The proxy server requests a set of other cooperating proxy servers to send their partial passwords. The partial passwords are brought into a secure enclave (and even an administrator on a machine cannot see them). If someone has ability to snoop over the network, he or she will only see a set of different keys arriving.

The password computing function may then pull all of these partial parts from the enclave and compute the actual secret. The final password might be stored in enclave memory for some period and then evicted (removed from memory altogether). In this way, even if a VM is compromised there is no means to derive the password (as its either in the enclave of the VM or its completely distributed).

By distributing the password parts into multiple VMs embodiments may introduce one more security periphery. Consider, for example, an attack Points Of View ("POV"):

First, consider an attacker who has access to the container memory. If he or she scans through the application process memory (and even if captures the dump of the memory), will not see any password of any sort.

Next, consider an attacker who is more skilled and has access to the VM and can, for example, install tools such as the GNU De-Bugger ("GDB") tool, to inspect the memory of various processes. Because the passwords are enclaved, even dumping the process memory will not show meaningful information to the attacker.

Now consider an attacker who not just gets through VM access but is also able to attack SGX or a similar enclaving mechanism on other hardware platforms such AMD®. In this case, the attacker needs to have complete knowledge of the Internet Protocol ("IP'") used to fetch the partial parts of the password and the algorithm used to compute the password from the keys. This needs greater skill and more time for the attacker to determine. This increased window may give the platform operator sufficient time to react and perhaps kill the VM to thwart the attack.

Since the applications can move across VMs, an orchestrator may do the additional work of loading a proxy with the right partial password and giving the proxy the IP address of the other proxy components that hold the partial keys. This redistribution can be done, for example, when the application is rescheduled (e.g., due to a VM failure or for some other reason). The partial passwords can be held in an object store such as a Simple Storage Service ("S3") or in an elastic file system mounted on the VMs.

Suppose the secret password needed to access a DB is "1240." A very simplistic representation of the mathematical function is provided herein for clarity but in reality it may be much more complex. In this case, the cloud application may send a "4" as the key to the proxy server along with data to be encrypted. The proxy server contacts its peers (in this case two additional nodes) to send their partial keys. The second proxy sends "31" and the third proxy sends "10." These values may be individually loaded into a secure enclave, and the function to compute the secret (e.g., the multiplied product of the three values) may invoked. This function pulls the partial data from enclave, computes the secret, and puts it into the enclave:

$$4 \times 31 \times 10 = 1240$$

In this way, no proxy has the complete secret and, even if compromised, will not reveal anything important. The information sent over the network also doesn't reveal anything important. So, combining enclaves with MPC makes the encryption solution much more foolproof.

Figure 7:
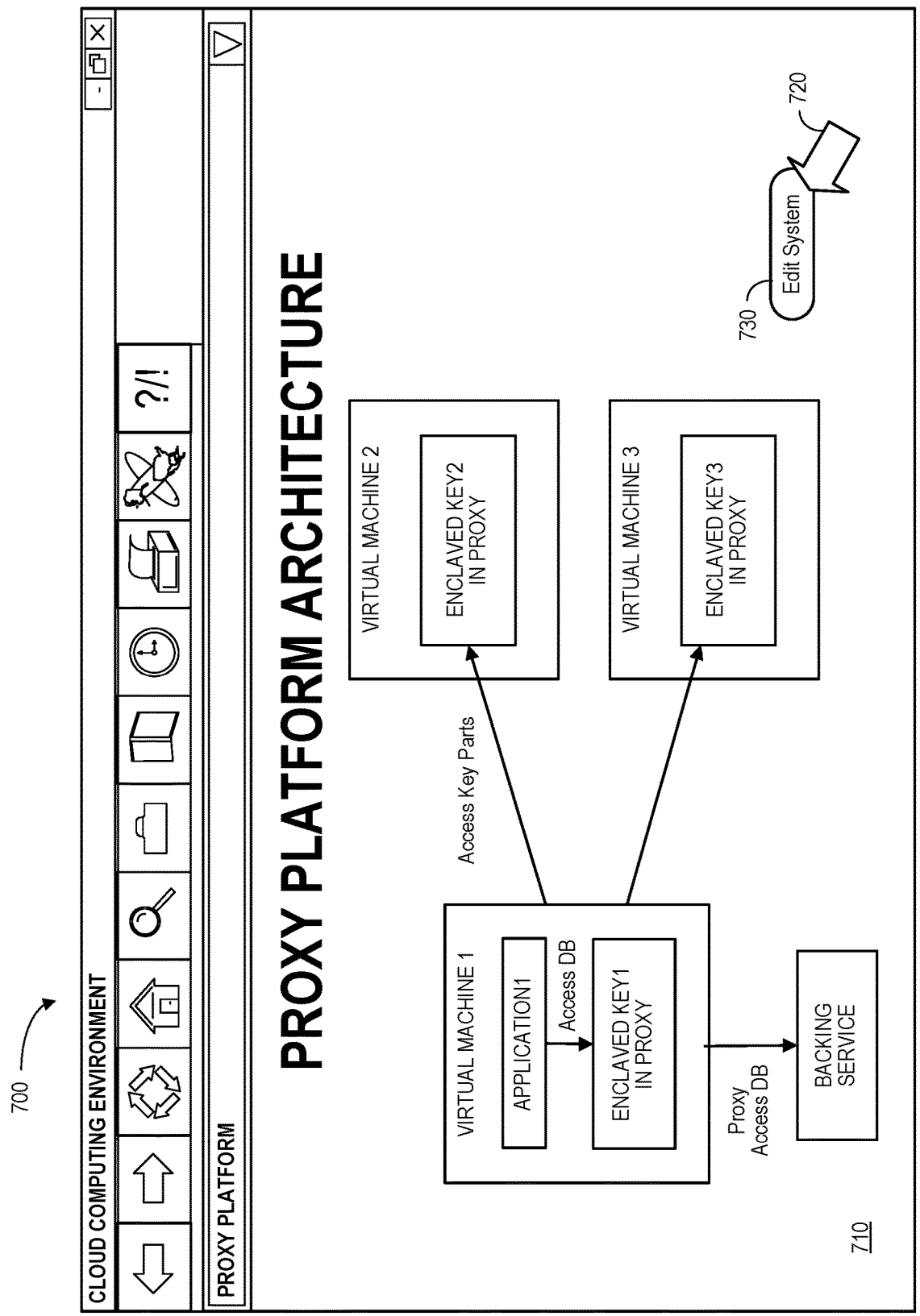
FIG. 7 is a user interface display according to some embodiments.

FIG. 7 is proxy platform display 700 according to some embodiments. The display 700 includes a graphical representation 710 of the elements of a system in accordance with any of the embodiments described herein. Selection of an element on the display 700 (e.g., via a touchscreen or a computer pointer 720) may result in display of a popup window containing more detailed information about that element and/or various options (e.g., to add a data element, modify a mapping, etc.). Selection of an "Edit System" icon 730 may let an operator or administrator change a multi-party computation algorithm, alter the number of nodes storing partial keys, etc.

Figure 8:
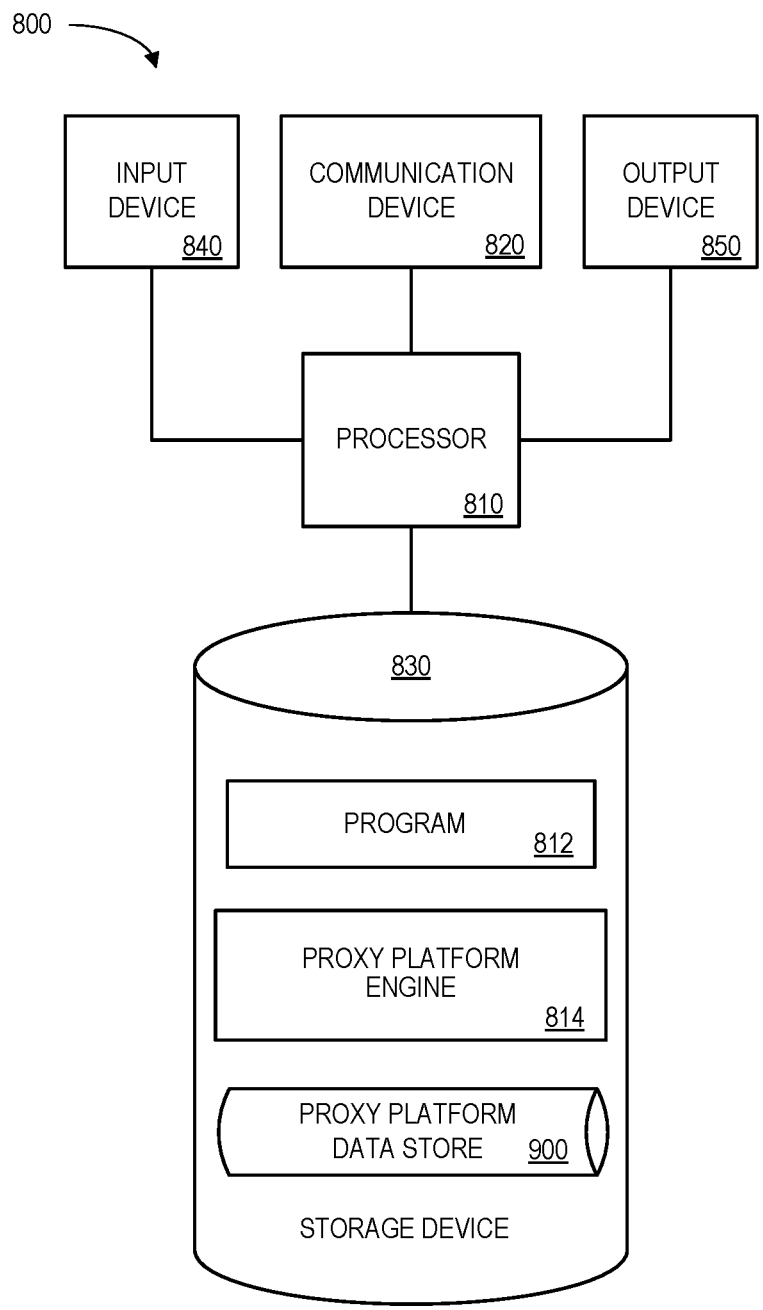
FIG. 8 is an apparatus or platform according to some embodiments.

Note that the embodiments described herein may also be implemented using any number of different hardware configurations. For example, FIG. 8 is a block diagram of an apparatus or platform 800 that may be, for example, associated with the systems 200, 400, 500, 600 of FIGS. 2, 4, 5, 6, respectively (and/or any other system described herein). The platform 800 comprises a processor 810, such as one or more commercially available Central Processing Units ("CPUs") in the form of one-chip microprocessors, coupled to a communication device 860 configured to communicate via a communication network (not shown in FIG. 8). The communication device 860 may be used to communicate, for example, with one or more remote user platforms, administrator platforms, etc. The platform 800 further includes an input device 840 (e.g., a computer mouse and/or keyboard to input cloud computing information) and/an output device 850 (e.g., a computer monitor to render a display, transmit recommendations, and/or create reports about nodes, proxies, secret keys, etc.). According to some embodiments, a mobile device, monitoring physical system, and/or PC may be used to exchange information with the platform 800.

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or a mapping expression engine 814 for controlling the processor 810. The processor 810 performs instructions of the programs 812, 814, and thereby operates in accordance with any of the embodiments described herein. For example, the processor 810 may detect that a first node needs to access a cloud application secret key and determine, based on information in a proxy platform data store 900, a set of nodes associated with the secret key that the first node needs to access. The processor 810 may then use a multi-party computation algorithm and information received from the set of nodes to generate the secret key.

The programs 812, 814 may be stored in a compressed, uncompiled and/or encrypted format. The programs 812, 814 may furthermore include other program elements, such as an operating system, clipboard application, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

In some embodiments (such as the one shown in FIG. 8), the storage device 830 further stores the proxy platform data store 900. An example of a database that may be used in connection with the platform 800 will now be described in detail with respect to FIG. 9. Note that the database described herein is only one example, and additional and/or different information may be stored therein. Moreover, various databases might be split or combined in accordance with any of the embodiments described herein.

Figure 9:
FIG. 9 is portion of a proxy platform data store in accordance with some embodiments.

Referring to FIG. 9, a table is shown that represents the proxy platform data store 900 that may be stored at the platform 800 according to some embodiments. The table may include, for example, entries associated with secret keys that may be needed in connection with a cloud computing environment. The table may also define fields 902, 904, 906, 908, 910 for each of the entries. The fields 902, 904, 906, 908, 910 may, according to some embodiments, specify: a key identifier 902, a first node identifier 904, a second node identifier 906, a multi-party computation algorithm 908, and a status 910. The proxy platform data store 900 may be created and updated, for example, when new keys are needed, a multi-party computation algorithm is changed, etc.

The key identifier 902 might be a unique alphanumeric label that is associated with a particular secret key (e.g., a password needed to decrypt information in a database application). The first node identifier 904 and second node identifier 906 may identify which nodes hold partial portion of the information that is needed to construct that secret key. The multi-party computation algorithm 908 may define the function that is used to compute the key to combine the partial portions and generate the key. The status 910 might indicate that the key has been generated and stored in a secure enclave.

Figure 10:
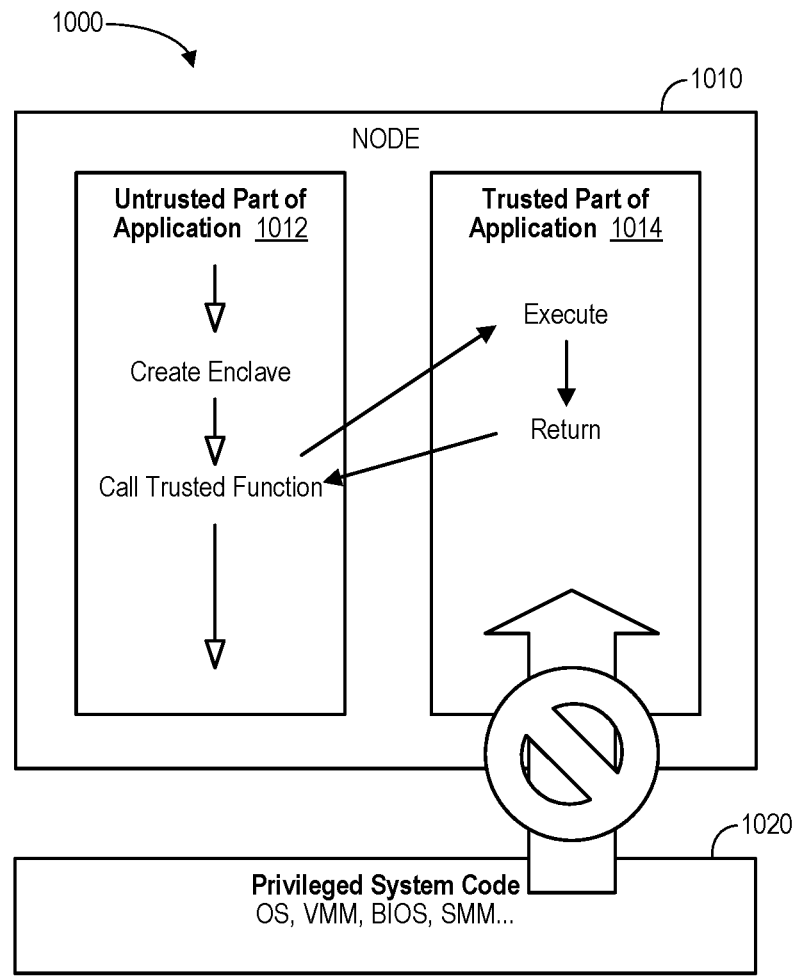
FIG. 10 is a secure enclave implementation according to some embodiments.

FIG. 10 is a secure enclave implementation 1000 according to some embodiments. In particular a node 1010 may include an untrusted part of an application 1012 and a trusted part of the application 1014 (e.g., associated with a TEE). The trusted part of the application 1014 may, for example, be safe from attacks via privileged system code 1020 (e.g., an Operating System ("OS"), a Virtual Machine Manager ("VMM"), a Basic Input Output System ("BIOS"), a System Management Mode ("SMM"), etc.). The untrusted part of the application 1012 may create an enclave and then call a trusted function. When the trusted function is called, the trusted part of the application 1014 executes as appropriate and returns to the untrusted part of the application 1012.

Thus, embodiments may facilitate protection of a cloud computing environment secret key using a multi-party computation algorithm in a secure, automatic, and efficient manner. Since security is a huge topic for cloud deployments (where there is a huge attack vector), embodiments described herein may build multiple layers of security around the application, making the solution more robust and of substantial business and technical value.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
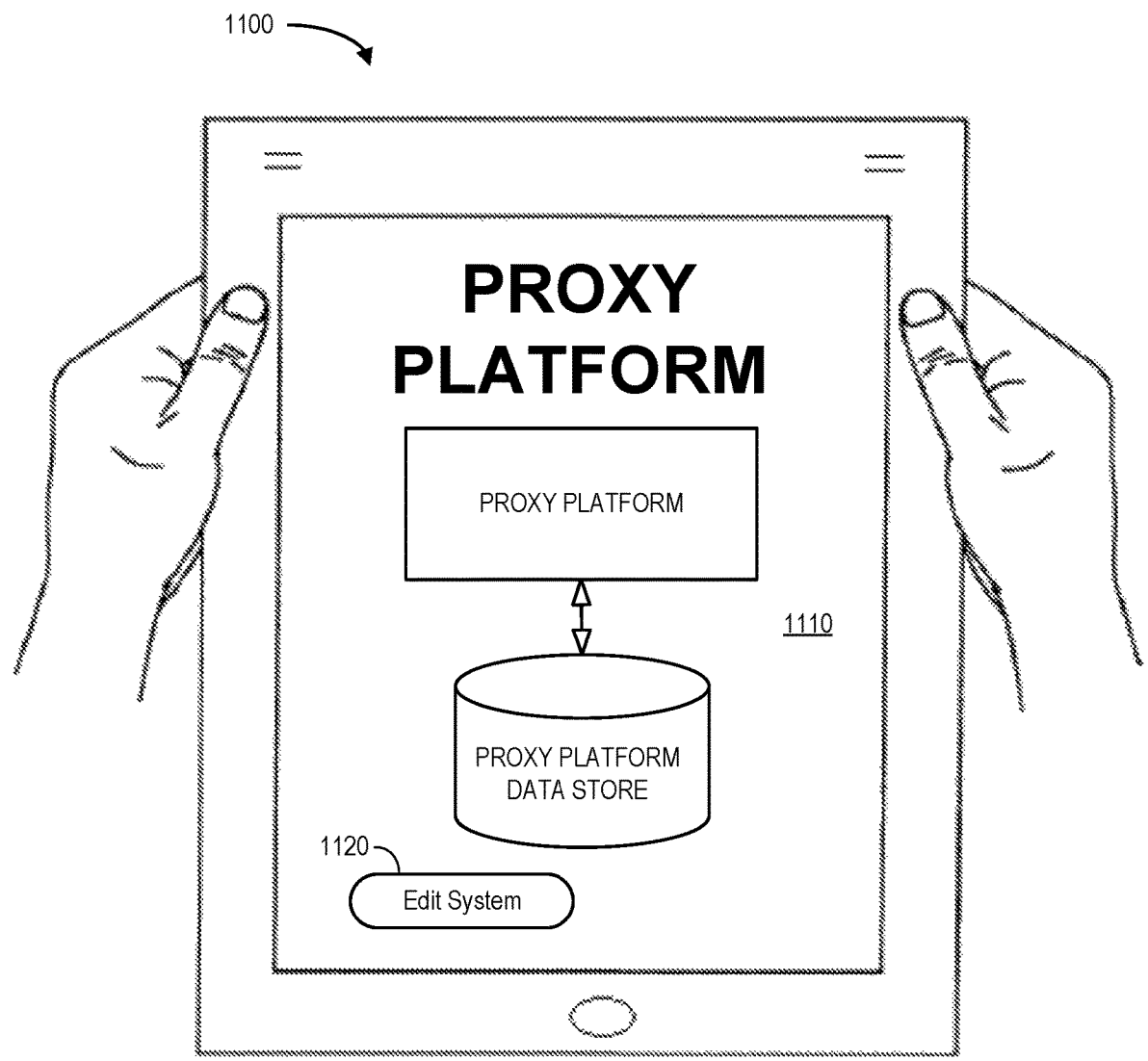
FIG. 11 is a tablet computer display in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of secret keys, any of the embodiments described herein could be applied to other types of secret keys. Moreover, the displays shown herein are provided only as examples, and any other type of user interface could be implemented. For example, FIG. 11 illustrates a handheld tablet computer 1100 showing a proxy platform display 1110 according to some embodiments. The proxy platform display 1110 might include user-selectable data that can be selected and/or modified by a user of the handheld computer 1100 (e.g., via an "Edit System" icon 1120) to view updated information about secret keys, cloud applications, multi-party computation algorithms, computing nodes, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
 a proxy platform data store containing node data associated with nodes of the cloud computing environment, each node storing multi-party computation information including a partial password key, wherein each partial password key is generated as a mathematical part of a single password; and
a proxy platform able to access the proxy platform data store, including:
a computer processor, and
computer memory, coupled to the computer processor, storing instructions that, when executed by the computer processor cause the processor to:
(i) detect that a first node needs to access a cloud application secret key via receipt of a request from the first node including a first node partial password key, wherein each node stores a respective partial password key prior to the detection,
(ii) determine, based on information in the proxy platform data store, a set of nodes associated with the cloud application secret key that the first node needs to access,
(iii) generate the cloud application secret key in a secure enclave at the proxy platform, the generation via application of a multi-party computation algorithm to the multi-party computation information, the multi-party computation algorithm combining the multi-party computation information including the partial password keys received from each node in the set of nodes and the received first node partial password key; and
(iv) store the generated cloud application secret key in the secure enclave at the proxy platform for some period and then evict the generated cloud application secret key.

2. The system of claim 1, wherein the secret key is associated with a cloud application password.

3. The system of claim 1, wherein the nodes are associated with at least one of (i) a virtual machine, and (ii) a container.

4. The system of claim 1, wherein the proxy platform executes on the first node.

5. The system of claim 1, wherein said detection is associated with a transmission control protocol proxy server that communicates via localhost.

6. The system of claim 1, wherein said detection comprises interception of an encrypted password request.

7. The system of claim 1, wherein multi-party computation information is stored in the secure enclave of each node.

8. The system of claim 7, wherein the secure enclaves are associated with at least one of: (i) a trusted execution environment, (ii) a software guard extension, (iii) a secure encrypted virtualization, and (iv) a similar enclaving technology.

9. A computer-implemented method associated with a cloud computing environment, comprising:
detecting, by a proxy platform, that a first node needs to access a cloud application secret key via receipt of a request from the first node including a first node partial password key, wherein each node stores a respective partial password key prior to the detection and each partial password key is generated as a mathematical part of a single password;
determining, based on information in a proxy platform data store, a set of nodes associated with the cloud application secret key that the first node needs to access, wherein the proxy platform data store contains node data associated with nodes of the cloud computing environment, each node storing multi-party computation information;
generating the cloud application secret key in a secure enclave at the proxy platform, the generation via application of a multi-party computation algorithm to the multi-party computation information, the multi-party computation algorithm combining the multi-party computation information including the partial password keys received from the set of nodes and the received first node partial password key; and
storing the generated cloud application secret key in the secure enclave at the proxy platform for some period and then evicting the generated cloud application secret key.

10. The method of claim 9, wherein the secret key is associated with a cloud application password.

11. The method of claim 9, wherein the nodes are associated with at least one of (i) a virtual machine, and (ii) a container.

12. The method of claim 9, wherein the proxy platform executes on the first node.

13. The method of claim 9, wherein said detection is associated with a transmission control protocol proxy server that communicates via localhost.

14. The method of claim 9, wherein said detection comprises interception of an encrypted password request.

15. The method of claim 9, wherein multi-party computation information is stored in the secure enclave of each node.

16. The method of claim 15, wherein the secure enclaves are associated with at least one of: (i) a trusted execution environment, (ii) a software guard extension, (iii) a secure encrypted virtualization, and (iv) a similar enclaving technology.

17. A non-transitory, computer readable medium having executable instructions stored therein that, when executed by a computer processor cause the processor to perform a method associated with a cloud computing environment, the method comprising:
detecting, by a proxy platform, that a first node needs to access a cloud application secret key via receipt of a request from the first node including a first node partial password key, wherein each node stores a respective partial password key prior to the detection and each partial password key is generated as a mathematical part of a password;
determining, based on information in a proxy platform data store, a set of nodes associated with the cloud application secret key that the first node needs to access, wherein the proxy platform data store contains node data associated with nodes of the cloud computing environment, each node storing multi-party computation information including a partial password key;
generating the cloud application secret key in a secure enclave at the proxy platform, the generation via application of a multi-party computation algorithm to the multi-party computation information, the multi-party computation algorithm combining the multi-party computation information including the partial password keys received from the set of nodes and the received first node partial password key received with the request; and
storing the generated cloud application secret key in the secure enclave at the proxy platform for some period and then evicting the generated cloud application secret key.

18. The medium of claim 17, wherein the secret key is associated with a cloud application password and the nodes are associated with at least one of (i) a virtual machine, and (ii) a container.

19. The medium of claim 17, wherein the proxy platform executes on the first node and said detection is associated with a transmission control protocol proxy server that communicates via localhost.

20. The medium of claim 17, wherein multi-party computation information is stored in the secure enclave of each node.

\* \* \* \* \*